United States Patent
Bohling et al.

(10) Patent No.: US 9,505,944 B2
(45) Date of Patent: Nov. 29, 2016

(54) COATINGS COMPOSITION WITH PIGMENT AND ADSORBING VINYL ACETATE BINDERS

(71) Applicant: Rohm and Haas Company, Philadelphia, PA (US)

(72) Inventors: James C. Bohling, Lansdale, PA (US); Catherine A. Finegan, Warrington, PA (US); Ericka Lynn Killian, Collegeville, PA (US); Edwin Hugh Nungesser, Horsham, PA (US); Morris C. Wills, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/761,222

(22) PCT Filed: Jan. 15, 2014

(86) PCT No.: PCT/US2014/011568
§ 371 (c)(1),
(2) Date: Jul. 15, 2015

(87) PCT Pub. No.: WO2014/113411
PCT Pub. Date: Jul. 24, 2014

(65) Prior Publication Data
US 2015/0361294 A1    Dec. 17, 2015

Related U.S. Application Data

(60) Provisional application No. 61/753,236, filed on Jan. 16, 2013.

(51) Int. Cl.
*C09D 133/14* (2006.01)
*C09D 131/04* (2006.01)
*C09D 143/02* (2006.01)
*C09D 101/28* (2006.01)
*C09D 175/04* (2006.01)
*C08K 3/22* (2006.01)

(52) U.S. Cl.
CPC ........... *C09D 133/14* (2013.01); *C09D 101/28* (2013.01); *C09D 131/04* (2013.01); *C09D 143/02* (2013.01); *C09D 175/04* (2013.01); *C08K 2003/2241* (2013.01); *C08L 2201/54* (2013.01)

(58) Field of Classification Search
CPC ........ C08L 43/02; C08L 33/02; C08L 35/02; C08L 2201/54; C08L 2201/52; C09D 131/04; C09D 133/02; C09D 133/14; C09D 143/02; C09D 5/028; C09D 101/28; C08K 2003/2241
See application file for complete search history.

(56) References Cited

U.S. PATENT DOCUMENTS

| | | | | |
|---|---|---|---|---|
| 4,812,510 A * | 3/1989 | Barnett | ................... | C08F 18/08 524/807 |
| 6,218,012 B1 * | 4/2001 | Rota | ..................... | C09D 7/1291 427/195 |
| 6,492,451 B1 * | 12/2002 | Dersch | .................. | C03C 17/009 524/430 |
| 9,346,970 B2 * | 5/2016 | Bohling | .................... | C08F 2/22 |
| 2008/0269402 A1 * | 10/2008 | Maurice | ................ | C08F 220/14 524/547 |
| 2011/0009540 A1 * | 1/2011 | Terrenoire | ............ | C08F 220/18 524/145 |
| 2015/0315406 A1 | 11/2015 | Bohling et al. | | |

FOREIGN PATENT DOCUMENTS

| | | |
|---|---|---|
| JP | 7138521 A | 5/1995 |
| WO | 2013163808 A1 | 11/2013 |
| WO | 2014019184 A1 | 2/2014 |

OTHER PUBLICATIONS http://www.resene.co.nz/archspec/cpd_earn_points/pdfs/CPD_volumesolidspvchiding_oct2003.pdf, Aug. 2005.*

Oota, Katsumi, et al.: "Phosphate Group-Containing Vinyl Copolymers for Coatings and Their Compositions with Good Compatibility with Pigments", Chemical Abstracts Service, Columbus, Ohio. XP002723264.

* cited by examiner

*Primary Examiner* — Satya Sastri

(74) *Attorney, Agent, or Firm* — Reid S. Willis

(57) ABSTRACT

The present invention relates to a coatings composition comprising an aqueous dispersion of polymer particles, pigment particles, and extender particles. The polymer particles comprise from 35 to 99.8 weight percent structural units of vinyl acetate and from 0.1 to 6 weight percent structural units of a phosphorus acid monomer or a salt thereof, and the coating composition has a pigment volume concentration in the range of from 25 up to the critical pigment volume concentration of the composition.

6 Claims, No Drawings

COATINGS COMPOSITION WITH PIGMENT AND ADSORBING VINYL ACETATE BINDERS

BACKGROUND OF THE INVENTION

The present invention relates to a coatings composition comprising an aqueous dispersion of polymer particles comprising vinyl acetate adsorbed to pigment particles.

Coating formulations are highly complex mixtures of polymers, pigments (most notably $TiO_2$), extenders, and additives. Most opaque or white coatings contain a substantial quantity of $TiO_2$. It is well known that film-forming polymer particles containing phosphate groups can adsorb to $TiO_2$ particles to form composites that improve spacing of the $TiO_2$ particles, which results in a whiter and more opaque appearance of the coating. This improved spacing allows the formulator to reduce the overall level of expensive $TiO_2$.

Especially attractive binders for architectural coatings are polymers (including copolymers) of vinyl acetate, which are known to have high scrub resistance at relatively low cost. Vinyl-acetate polymers that contain phosphate groups would be especially desirable as film forming polymers due to the cost benefits provided by reduced $TiO_2$ usage.

One of the shortcomings of coatings formulations using vinyl acetate based binders is that they tend not to provide adequate stain resistance and stain washability, resulting in the need to touch up a stained surface or even repaint an entire wall. Accordingly, it would be desirable to find a low cost $TiO_2$-adsorbing vinyl acetate based binder that has improved stain resistance and stain-removal properties.

SUMMARY OF THE INVENTION

The present invention addresses a need by providing a coating composition comprising an aqueous dispersion of polymer particles, pigment particles, and extender particles wherein the polymer particles comprise, in a single phase and based on the weight of the polymer particles, from 35 to 99.8 weight percent structural units of vinyl acetate and from 0.1 to 6 weight percent structural units of a phosphorus acid monomer or a salt thereof, wherein the coating composition is further characterized by a pigment volume concentration in the range of from 25 up to the critical pigment volume concentration of the composition.

DETAILED DESCRIPTION OF THE INVENTION

The present invention is a coating composition comprising an aqueous dispersion of polymer particles, pigment particles, and extender particles wherein the polymer particles comprise, in a single phase and based on the weight of the polymer particles, from 35 to 99.8 weight percent structural units of vinyl acetate and from 0.1 to 6 weight percent structural units of a phosphorus acid monomer or a salt thereof, wherein the coating composition is further characterized by a pigment volume concentration in the range of from 25 up to the critical pigment volume concentration of the composition.

As used herein, the term "in a single phase" refers to the fact that the polymer particles comprise one or more copolymers comprising structural units of vinyl acetate and the phosphorus acid monomer with the described proportions.

As used herein, the term "extender particles" refer to inorganic materials that are used to increase the pigment volume concentration of the coating composition. Extender particles are generally distinguished from pigment particles by their lower index of refraction (typically from 1.3 to 1.6 as compared to above 2.0 for pigments. Examples of suitable extenders include, calcium carbonate, clays, aluminum silicates, silica, calcium silicates, mica, talc, and nephilene syenite.

As used herein, the term "structural units" refers to the remnant of the recited monomer after polymerization. For example, a structural unit of vinyl acetate is as illustrated:

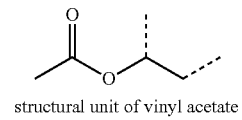

structural unit of vinyl acetate where the dotted lines represent the points of attachment of the structural unit to the polymer backbone. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates and methacrylates, including phosphoethyl methacrylate and phosphopropyl methacrylate, with phosphoethyl methacrylate or a salt thereof being especially preferred. A preferred phosphonate is 2-(methacryloyloxy)ethyl phosphonic acid or a salt thereof.

"Phosphoethyl methacrylate" (PEM) is used herein to refer to the following structure:

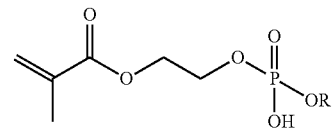

where R is H or

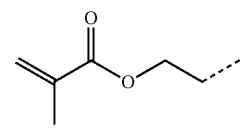

A preferred concentration of structural units of the phosphorus acid monomer, preferably PEM, is from 0.2, more preferably from 0.5 to 4, more preferably to 2 weight percent, based on the weight of the polymer particles.

The polymer particles preferably comprise 0.1 to 2.0 weight percent, based on the weight of the polymer particles, structural units of a sulfur acid monomer or a salt thereof. Examples of suitable sulfur acid monomers include sulfoethyl methacrylate, sulfopropyl methacrylate, vinyl sulfonic acid, 2-acrylamido-2-methyl propanesulfonic acid, and 2-methacrylamido-2-methyl propanesulfonic acid, and salts thereof. Preferred sulfur acid monomers are 2-acrylamido-2-methyl propanesulfonic acid and vinyl sulfonic acid, and salts thereof. The polymer particles more preferably comprise 0.5 to 1.5 weight percent, based on the weight of the polymer particles, structural units of 2-acrylamido-2-methyl propanesulfonic acid or a salt thereof.

The polymer particles are preferably film-forming at ambient temperature and preferably adsorb to the surface of the pigment particles. For example, when $TiO_2$ is blended with a VA-PEM latex, adsorption can be seen by way of scanning electron microscopy or centrifugation. As used herein, "adsorb" refers to polymer particles contacting or attaching to the surface of the $TiO_2$ particles in a manner other than covalent bonding. It is preferred that the polymer particles include structural units of monomers resulting polymer particles with a $T_g$, as measured using differential scanning calorimetry at a heating rate of 5° C./min, of from −10° C., more preferably from −5° C., to 30° C., more preferably to 20° C., and most preferably to 10° C. The polymer particles preferably include from 10 to 64.8 weight percent, based on the weight percent of the polymer particles, structural units of acrylate monomers, preferably ethyl acrylate, butyl acrylate, or 2-ethylhexyl acrylate, or combinations thereof. More preferably, the polymer particles include from 10 to 40 weight percent structural units of butyl acrylate, based on the weight of the polymer particles.

The composition of the present invention is prepared by contacting a stable aqueous dispersion of the polymer particles with pigment particles, preferably an aqueous dispersion of pigment particles (also known as a slurry), to form the aqueous dispersion of polymer particles that preferably adsorb to the surface of the pigment particles, for example, $TiO_2$ particles. In some instances, it is preferred that the $TiO_2$ particles contain an absence or substantial absence of oxides or hydroxides of zirconium. Examples of suitable commercial $TiO_2$ products include Ti-Pure R-706 $TiO_2$ powder, Ti-Pure R-746 $TiO_2$ slurry, Tronox Cr-826s $TiO_2$, Kronos 4311 $TiO_2$ slurry, and Kronos 2310 $TiO_2$ powder.

The aqueous dispersion of polymer particles can be prepared by forming an at least partially neutralized solution of the phosphorus acid monomer, then contacting the solution with vinyl acetate and optionally the sulfur acid monomer, or salt thereof, and/or the acrylate monomer under emulsion polymerization conditions. As used herein, the term "at least partially neutralized phosphorus acid monomer" refers to an aqueous solution of a phosphorus acid monomer containing not less than ½ the molar amount of neutralizing agent required to neutralize the monomer, up to the amount required to completely neutralized the monomer, preferably up to the amount required to reach a pH equal to the highest $pK_a$ (preferably the second $pK_a$) of the monomer. For example, if the neutralizing agent is ammonia, and the phosphorus acid monomer is PEM, the suitable molar ratio of ammonia to PEM would be at least 1:1 and preferably up to 2:1. Suitable neutralizing agents include, for example, ammonia, KOH, NaOH, ethanol amine, and aminomethyl propanol. It is preferred that pH of the aqueous solution of the phosphorus acid monomer, prior to contact with the vinyl acetate and optionally one or more additional monomers, be in the range of from 4.5, more preferably from 5.0, most preferably from 5.5; to 8.0, more preferably to 7.5, and most preferably to 7.2. The pH of the polymerization medium is maintained at such a level to minimize the hydrolysis of the vinyl acetate monomer or of the polymer, and is preferably buffered throughout the polymerization process to maintain a pH in the range of from 4.5, more preferably from 5.5; to 8, more preferably to 7. After the polymerization is complete, the consequent stable aqueous dispersion of polymer particles may be contacted with pigment particles to form a composite. In that case, the aqueous dispersion of polymer particles is advantageously adjusted to a pH in the range of 8 to 10 before, during, or after being contacted with the pigment particles, preferably an aqueous dispersion of $TiO_2$ particles, to form the composite of polymer particles and the pigment particles.

Because the polymerization reaction is carried out at a pH that does not promote the hydrolysis of vinyl acetate, very low levels of acetic acid or a salt thereof (i.e., the hydrolysis products of vinyl acetate) are formed during the polymerization process. Consequently, yields of useful polymer are improved, VOCs are reduced, and production of a less desirable hydrophilic polymer (due to generation of pendant OH groups as a consequence of hydrolysis) is reduced. Although it may be desirable to add some small amount (generally less than 500 ppm) of an acetate buffer to maintain the pH in the desired range during polymerization, the amount of acetic acid or a salt thereof generated is less than 5 weight percent, preferably less than 1 weight percent, more preferably less than 0.5 weight percent, and most preferably less than 0.1 weight percent, based on the weight of the vinyl acetate monomer.

The polymer particles preferably further comprise a substantial absence of structural units of methyl methacrylate and styrene, as well as a substantial absence of pendant alcohol functional groups. As used herein, "a substantial absence of structural units of methyl methacrylate and styrene" refers to a polymer comprising less than 5 weight percent, preferably less than 1 weight percent structural units of methyl methacrylate, and less than 5 weight percent, preferably less than 1 weight percent structural units of styrene. Similarly "a substantial absence of pendant alcohol functional groups" refers to a polymer comprising less than 5 weight percent pendant alcohol groups, preferably less than 1 weight percent pendant alcohol groups.

The coating composition of the present invention is further characterized by a pigment volume concentration (PVC) in the range of from 25 up to the critical pigment volume concentration of the composition. Preferably the PVC of the coating composition is in the range of from 30, more preferably from 35, to 75, more preferably to 65, and most preferably to 55.

The term "critical pigment volume concentration" (CPVC) refers to the lowest concentration of polymer required to wet the surface of the pigment particles. Below CPVC there is an excess amount of polymer relative to the amount of pigments and extenders. As such, at PVCs at or below CPVC, an adequate relative amount of binder volume to pigment/extender volume is present, leading to a substantially nonporous dry coating.

Above CPVC, the volume of binder is insufficient to coat all pigment and extender to form a porous dry coating, resulting in a deterioration of the properties and performance of the consequent coating. For example, abrasion resistance and stain resistance and removal are superior for coatings at or below CPVC as compared to coatings above CPVC.

The CPVC of a coating can be conveniently determined using reflectance, as follows: The difference in reflectance of a coated film in the dry state is compared to the same film that has been rewetted with a penetrating solvent (such as Isopar L solvent) that fills the air voids of the dry coating. When a coating is above CPVC, the Y-reflectance of the re-wetted coating will decrease by at least 2% from the initial Y-reflectance value of the dry coating.

The composition of the present invention preferably has a volume solids content of from 25 to 45 volume percent, based on the total volume of the composition.

The composition may also include any of a variety of other materials such as solvents; fillers; rheology modifiers such as HASE, ASE, HEUR and HEC thickeners or combinations thereof; hollow pigments, including pigments having one or more voids; dispersants; defoamers; preservatives; flow agents; leveling agents; and neutralizing agents, such as hydroxides, amines, ammonia, and carbonates. Preferably, the composition has a volatile organic content (VOC) of less than 50 g/L.

| Abbreviation | Chemical name or description (% s in water are indicated) |
|---|---|
| FES-32 | Disponil FES-32 fatty ether sulfate (30% aq) |
| PEM | Phosphoethyl methacrylate, 60% active |
| aq $NH_3$ | Ammonia solution, base (29% aq) |
| FES-77 | Disponil FES-77 fatty ether sulfate (33% aq) |
| T 15-S-40* | TERGITOL ™ Secondary Alcohol Ethoxylate (70% aq) |
| DS-4 | Rhodacal sodium dodecylbenzene sulfonate (22% aq) |
| Na-AMPS | Sodium 2-acrylamido-2-methyl-1-propanesulfonate (50% aq) |
| BA | Butyl acrylate |
| VA | Vinyl acetate |
| IAA | Isoascorbic acid |
| t-BHP | t-Butyl hydroperoxide |
| PS | Particle Size |
| Acet | Acetaldehyde |
| $TiO_2$ slurry | Ti-Pure R-746 $TiO_2$ slurry |
| RM2020* | ACRYSOL ™ RM2020 Rheology Modifier |
| RM-895 | ACRYSOL ™ RM895 Rheology Modifier |
| Natrosol | Natrosol Plus 330 HMHEC (4% aq) |
| CF-10* | TRITON ™ CF-10 Surfactant |
| AMP | 2-Amino-2-methyl-1-propanol |
| Foamaster | Foamaster VL Defoamer |
| Texanol | Texanol Coalescent |
| $TiO_2$ PVC | $TiO_2$ Pigment Volume Concentration of in the Paint |
| ROVACE 9900* | ROVACE ™ 9900 Emulsion Polymer |
| 731A | TAMOL ™ 731A Dispersant |
| CELLOSIZE | CELLOSIZE ™ QP-300H Thickener |

*ROVACE, TRITON, ACRYSOL, TAMOL, CELLOSIZE, and TERTIGOL are Trademarks of The Dow Chemical Company or its Affiliates.

Example 1

Preparation of BA/VA/PEM Latex

Deionized (DI) water (1331.8 g), $FeSO_4$ heptahydrate (0.05 g), and FES-32 (36.94 g) were charged to a 5-L 4-necked round bottom flask equipped with a mechanical stirrer, $N_2$ blanket, thermometer, condenser, heating mantel, and temperature controller. The reactor contents were heated to 72.5° C. The monomer emulsion was prepared by first mixing DI water (349.0 g) and PEM (34.10 g) in a vessel and adjusting the pH to 6.8 with $NH_3$ solution (19 g). FES-77 (27.38 g), T 15-S-40 (49.93 g), and DS-4 (32.55 g) were then added followed by BA (543.47 g), VA (1108.25 g) and Na-AMPS (38.36 g). The initiator solution was prepared separately by mixing DI water (194.2 g), t-BHP (7.31 g) and sodium acetate (NaOAc, 5.27 g). A separate solution of DI water (142.46 g) and IAA (7.54 g) was prepared along with a solution of DI water (54.60 g) and $NaHSO_3$ (2.27 g). The emulsion polymerization reaction was carried out by feeding the monomer emulsion of 2 h (20.39 g/min) with simultaneous feeds of both the t-BHP initiator solution and the IAA solution over 3 h (0.83 g/min) The rest of the t-BHP solution and the $NaHSO_3$ solution were then fed over 1 h (0.95 g/min) The reaction was maintained at 72.5° C. for the duration of the entire reaction (4 h total), after which time the latex was cooled to 40° C. The pH of the final latex was about 5.5 and was adjusted to 6.8 with aq. $NH_3$ (3.0 g).

Comparative Examples 1 and 2 were prepared substantially as described in Example 1 except where indicated in Table 1.

Example 2

Preparation of BA/VA/PEM Latex Using a Seeded Process

DI water (631.4 g), $FeSO_4$ heptahydrate (0.05 g), and acrylic seed latex (BA/MMA/MAA, 40.9% solids, 65 nm, 166.75 g) were charged to a 5-L 4-necked round bottom flask equipped with a mechanical stirrer, $N_2$ blanket, thermometer, condenser, heating mantel, and temperature controller. The reactor contents were heated to 72.5° C. The monomer emulsion was prepared by first mixing DI water (328.0 g) and PEM (34.10 g) in a vessel and adjusting the pH to 6.8 with $NH_3$ solution (19 g). FES-32 (36.94 g), FES-77 (27.38 g), T 15-S-40 (49.93 g), and DS-4 (32.55 g) were then added followed by BA (543.47 g), VA (1108.25 g) and Na-AMPS (38.36 g). The initiator solution was prepared separately by mixing DI water (194.2 g), t-BHP (7.31 g) and sodium acetate (5.27 g). A separate solution of DI water (142.46 g) and IAA (7.54 g) was prepared along with a solution of DI water (54.60 g) and $NaHSO_3$ (2.27 g). The emulsion polymerization reaction was carried out by feeding the monomer emulsion over 2 h (20.39 g/min) with concomitant feeds of both the t-BHP initiator solution and the IAA solution over 3 h (0.83 g/min) The rest of the t-BHP solution and the $NaHSO_3$ solution were then fed over 1 h (0.95 g/min) The reaction was maintained at 72.5° C. for the duration of the entire reaction (4 h total), after which time the latex was cooled to 40° C. The pH of the final latex was about 5.5 and was adjusted to 6.8 with aq. $NH_3$ (3.0 g).

TABLE 1

VA/BA/PEM Latex Compositions

| | Composition | | | | | Latex | |
|---|---|---|---|---|---|---|---|
| Ex. # | Acrylic seed[a] | BA | VA | PEM[b] | AMPS[c] | Latex Solids | PS (nm) |
| 1 | 0 | 31.9% | 65.0% | 2.0% | 1.13% | 44.3% | 110 |
| 2 | 3.3% | 31.5% | 64.3% | 2.0% | 1.13% | 51.0% | 190 |
| Comp. 1 | 0 | 34.4% | 65.0% | 0% | 0.65% | 55.0% | 250 |
| Comp. 2 | 0 | 15.0% | 85.0% | 0% | 0 | 55.0% | 250 |

[a]based on total monomer
[b]% PEM is uncorrected for active amount, which is ~60% of the reported percentage
[c]% reported reflects actual concentration of active material It has surprisingly been discovered that stable latexes containing VA and PEM or VA, BA, and PEM can be prepared at a pH considerably higher than what was previously thought to be feasible. U.S. Pat. No. 6,710,161 teaches that low pH polymerization is necessary to avoid extensive partitioning of phosphorus acid oligomers or polymers into the aqueous phase, which leads to the production of unacceptable levels of grit in paint formulations. Since acidic solutions promote the hydrolysis of vinyl acrylate, it would seem difficult, if not impossible to form stable latexes incorporating phosphorus acid monomers (such as PEM) and VA. Nevertheless, it has been demonstrated that polymerization of VA and PEM, which can be carried out in a single stage at a pH in the range of 4.5 to 8, preferably in the range of 5.5 to 7, results in a dispersion of homogeneous polymer particles to provide a substantially grit-free formulation with enhanced pigment efficiency.

Paint Formulations:

Prior to adding formulation components, binder was transferred into a 1-L plastic container and mixed using a 3-blade pitched metal stirrer; ammonia was added in a sufficient amount to achieve a pH of 8.5-9.5. After the addition of the base was complete, TiO$_2$ slurry part A was added to the binder with constant mixing. After the completion of the addition of the TiO$_2$ slurry part A, grind, coalescent, surfactant, and defoamer were added; sufficient thickener was then added to achieve a Krebs unit viscosity of at least 85 KU and ICI viscosity of at least 0.8. Table 2 describes the composition of paint formulations using binder Examples 1 and 2 and Comparative Examples 1 and 2, all with Total PVCs of 36. All amounts are in grams. Table 3 describes the composition of paint formulations using binder Examples 1 and 2 and Comparative Examples 1 and 2, all with Total PVCs of 53, which is just below CPVC. Table 4 describes the composition of paint formulations using binder Examples 1 and 2 with Total PVCs of 70 (which is above CPVC). All formulations in Tables 2-4 have a volume solids of 40%.

For Tables 2-4, "stain testing" refers to stain testing in accordance with ASTM D4828-94 for color change after exposure to the listed stain media, Mineral oil based soilant (black) (Mineral oil based) and Leneta stain ST-1 (black) (Leneta stain ST-1). CD, SD, and N are color change designations: CD refers to considerably darker, SD refers to slightly darker, and N refers to no change in color.

As Tables 2 and 3 illustrate, paints with PVCs of 36 and 53 that are formulated using the binder of the present invention show superior stain resistance over formulations that use VA-based, nonPEM-containing binders. Table 4, which illustrates that above CPVC, the paint formulations using the VA-PEM binders show poor stain resistance.

TABLE 2

Composition of Paint Formulations with Total PVC of 36

|  | Comp. 1 | Comp. 2 | Ex. 1A | Ex. 1B | Ex. 2A | Ex. 2B |
|---|---|---|---|---|---|---|
| PVC of TiO$_2$ Grind | 13.5 | 13.5 | 13.5 | 11.5 | 13.5 | 11.5 |
| Water | 81.04 | 81.04 | 81.04 | 88.84 | 81.04 | 88.84 |
| CELLOSIZE | 3.00 | 3.00 | 3.00 | 3.00 | 3.00 | 3.00 |
| TiO$_2$ slurry | 150.00 | 150.00 | 150.00 | 150.00 | 150.00 | 150.00 |
| CF-10 | 0.73 | 0.73 | 0.73 | 0.73 | 0.73 | 0.73 |
| Foamaster | 0.73 | 0.73 | 0.73 | 0.73 | 0.73 | 0.73 |
| Ammonia (28%) | 0.10 | 0.10 | 0.10 | 0.10 | 0.10 | 0.10 |
| 731A | 7.64 | 7.64 | 7.64 | 8.33 | 7.64 | 8.33 |
| Omyacarb 5 extender | 91.75 | 91.75 | 91.75 | 100.00 | 91.75 | 100.00 |
| Minex 10 extender | 49.30 | 49.30 | 49.30 | 53.73 | 49.30 | 53.73 |
| Optiwhite clay | 49.30 | 49.30 | 49.30 | 53.73 | 49.30 | 53.73 |
| Grind Sub-Total Letdown | 433.59 | 433.59 | 433.59 | 459.19 | 433.59 | 459.20 |
| Comp. binder 1 | 447.41 |  |  |  |  |  |
| Comp. binder 2 |  | 449.05 |  |  |  |  |
| Example binder 1 |  |  | 557.80 | 557.50 |  |  |
| Example binder 2 |  |  |  |  | 484.42 | 483.98 |
| Ammonia (28%) | 1.30 | 1.30 | 1.30 | 1.30 | 1.30 | 1.22 |
| TiO$_2$ slurry (A) | 85.81 | 85.81 | 85.70 | 50.75 | 85.70 | 50.75 |
| CF-10 | 1.40 | 1.40 | 1.40 | 1.40 | 1.40 | 1.40 |
| Foamaster | 1.40 | 1.40 | 1.40 | 1.40 | 1.40 | 1.40 |
| Texanol | 12.30 | 18.52 | 12.30 | 12.29 | 12.30 | 12.29 |
| RM-895 | 2.20 | 2.20 | 2.20 | 2.20 | 2.20 | 3.36 |
| RM-2020 | 8.40 | 8.40 | 8.40 | 8.40 | 8.40 | 25.39 |
| Water | 123.64 | 116.70 | 15.26 | 15.38 | 87.21 | 70.15 |
| Total | 1117.47 | 1118.37 | 1119.36 | 1109.81 | 1117.92 | 1109.14 |
| Stain testing |  |  |  |  |  |  |
| Mineral oil based | CD | CD | N | N | N | N |
| Leneta Stain ST-1 | CD | CD | SD | SD | SD | SD |

TABLE 3

Composition of Paint Formulations with Total PVC of 53

|  | Comp. 1A | Comp. 2A | Ex. 1C | Ex. 1D | Ex. 2C | Ex. 2D |
|---|---|---|---|---|---|---|
| PVC of TiO$_2$ Grind | 13.5 | 13.5 | 13.5 | 11.5 | 13.5 | 11.4 |
| Water | 160.00 | 160.00 | 160.00 | 130.00 | 160.00 | 130.00 |
| TiO$_2$ slurry | 150.00 | 150.00 | 150.00 |  | 150.00 |  |
| CELLOSIZE | 3.00 | 3.00 | 3.00 | 3.00 | 3.00 | 3.00 |
| CF-10 | 1.28 | 1.28 | 1.28 | 1.28 | 1.28 | 1.28 |
| Foamaster VL | 1.28 | 1.28 | 1.28 | 1.28 | 1.28 | 1.28 |
| Ammonia (28%) | 0.21 | 0.21 | 0.21 | 1.00 | 0.21 | 0.37 |

TABLE 3-continued

Composition of Paint Formulations with Total PVC of 53

|  | Comp. 1A | Comp. 2A | Ex. 1C | Ex. 1D | Ex. 2C | Ex. 2D |
|---|---|---|---|---|---|---|
| 731A | 13.41 | 13.41 | 13.41 | 13.41 | 13.41 | 13.41 |
| TiO₂ slurry |  |  |  | 50.00 |  | 150.00 |
| Omyacarb 5 extender | 161.00 | 161.00 | 161.00 | 169.00 | 161.00 | 169.00 |
| Minex 10 extender | 86.50 | 86.50 | 86.50 | 90.80 | 86.50 | 90.80 |
| Optiwhite extender | 86.50 | 86.50 | 86.50 | 90.80 | 86.50 | 90.80 |
| Grind Sub-Total | 663.19 | 663.19 | 663.19 | 550.57 | 663.19 | 649.94 |
| Letdown |  |  |  |  |  |  |
| Comp. binder 1 | 328.16 |  |  |  |  |  |
| Comp. binder 2 |  | 329.36 |  |  |  |  |
| Example binder 1 |  |  | 409.27 | 411.67 |  |  |
| Example binder 2 |  |  |  |  | 355.29 | 355.75 |
| Ammonia (28%) | 1.30 | 1.30 | 1.30 | 1.30 | 1.30 | 1.30 |
| TiO₂-1 (A) | 85.66 | 85.66 | 85.66 | 150.29 | 85.66 | 50.31 |
| CF-10 | 1.40 | 1.40 | 1.40 | 1.40 | 1.40 | 1.40 |
| Foamaster | 1.40 | 1.40 | 1.40 | 1.40 | 1.40 | 1.40 |
| Texanol | 9.02 | 13.59 | 9.02 | 9.04 | 9.02 | 9.04 |
| RM-895 | 2.20 | 2.20 | 2.20 | 2.20 | 2.20 | 2.20 |
| RM-2020 | 8.40 | 8.40 | 8.40 | 8.40 | 8.40 | 8.40 |
| Water | 95.67 | 90.58 | 16.00 | 51.49 | 68.92 | 106.93 |
| Total | 1196.40 | 1197.07 | 1197.84 | 1187.75 | 1196.78 | 1186.66 |
| Stain testing |  |  |  |  |  |  |
| Mineral oil based | CD | CD | N | N | N | N |
| Leneta Stain ST-1 | CD | CD | SD | SD | SD | SD |

TABLE 4

Composition of Paint Formulations with Total PVC of 70

|  | Comp. 3 | Comp. 4 | Comp. 5 | Comp. 6 |
|---|---|---|---|---|
| PVC of TiO₂ | 13.50% | 11.47% | 13.50% | 11.47% |
| Grind |  |  |  |  |
| Water | 180.00 | 180.00 | 180.00 | 180.00 |
| CELLOSIZE | 3.00 | 3.00 | 3.00 | 3.00 |
| TiO₂ slurry | 150.00 | 150.00 | 150.00 | 150.00 |
| CF-10 | 1.84 | 1.84 | 1.84 | 1.84 |
| Foamaster | 1.84 | 1.84 | 1.84 | 1.84 |
| Ammonia (28%) | 0.30 | 0.37 | 0.30 | 0.37 |
| 731A | 19.20 | 19.20 | 19.20 | 19.20 |
| Omyacarb 5 extender | 230.50 | 238.25 | 230.50 | 238.25 |
| Minex 10 extender | 123.84 | 128.01 | 123.84 | 128.01 |
| Optiwhite clay | 123.84 | 128.01 | 123.84 | 128.01 |
| Grind Sub-Total | 834.35 | 850.52 | 834.35 | 850.51 |
| Letdown |  |  |  |  |
| Example binder 1 | 260.34 | 262.70 |  |  |
| Example binder 2 |  |  | 226.00 | 227.01 |
| Ammonia (28%) | 1.30 | 1.30 | 1.30 | 1.30 |
| TiO₂ slurry (A) | 85.65 | 50.33 | 85.65 | 50.31 |
| CF-10 | 1.40 | 1.40 | 1.40 | 1.40 |
| Foamaster | 1.40 | 1.40 | 1.40 | 1.40 |
| Texanol | 5.74 | 5.77 | 5.74 | 5.77 |
| RM-895 | 2.20 | 2.20 | 2.20 | 2.20 |
| RM-2020 | 8.40 | 8.40 | 8.40 | 8.40 |
| Water | 75.86 | 82.36 | 109.53 | 117.29 |
| Total | 1276.65 | 1266.37 | 1275.97 | 1265.59 |
| Stain testing |  |  |  |  |
| Mineral oil based | CD | CD | CD | CD |
| Leneta Stain ST-1 | CD | CD | CD | CD |

The invention claimed is:

1. A coating composition comprising an aqueous dispersion of polymer particles, pigment particles, and extender particles wherein the polymer particles comprise, in a single phase and based on the weight of the polymer particles, at least 35 weight percent structural units of vinyl acetate, from 10 to 64.8 weight percent structural units of ethyl acrylate, 2-ethylhexyl acrylate, or butyl acrylate or a combination thereof; from 0.1 to 2.0 weight percent structural units of 2-acrylamido-2-methylpropane sulfonic acid or a salt thereof or sodium vinyl sulfonate, and from 0.2 to 6 weight percent structural units of phosphoethyl methacrylate or a salt thereof, wherein the coating composition is further characterized by a pigment volume concentration in the range of from 25 up to the critical pigment volume concentration of the composition, and wherein the polymer particles have an average particle size by dynamic light scattering in the range of from 110 nm to 200 nm.

2. The coating composition of claim 1 wherein the composition is further characterized by having less than 1.0 percent by weight acetic acid or a salt thereof based on the weight of structural units of vinyl acetate, wherein the polymer particles have $T_g$ in the range of $-30°$ C. to $50°$ C., wherein the polymer particles comprise from 0.2 to 4 weight percent structural units of phosphoethyl methacrylate or a salt thereof; and wherein the pigment particles comprise TiO₂ particles.

3. The coating composition of claim 2 wherein the polymer particles comprise, based on the weight of the polymer particles, from 10 to 40 weight percent structural units of butyl acrylate.

4. The coating composition of claim 1 wherein the polymer particles further comprise a substantial absence of structural units of methyl methacrylate and styrene.

5. The coating composition of claim 4 wherein the pigment volume concentration of the composition is from 30 to 55; and the $T_g$ of the polymer particles is from $-10°$ C. to $30°$ C.

6. The coating composition of claim 1 wherein the $T_g$ of the polymer particles is from $-5°$ C. to $10°$ C., wherein the composition further comprises a HEUR or a HEC thickener or a combination thereof; wherein the composition has a volatile organic content of less than 50 g/L; and wherein the composition has a volume solids content of from 25 to 45 volume percent, based on the total volume of the composition.

\* \* \* \* \*